United States Patent [19]
Kawai et al.

[11] Patent Number: 5,309,041
[45] Date of Patent: May 3, 1994

[54] NUTATING STEP MOTOR

[75] Inventors: Teruo Kawai, 4-3905, Nishi-kamata 7-chome, Ota-ku, Tokyo 144; Tsutomu Asai, 5-19, Yahara 6-chome, Nerima-ku, Tokyo 177, both of Japan

[73] Assignees: Nihon Riken Kabushiki Kaisha; Teruo Kawai, both of Tokyo; Keiichiro Asaoka, Kanagawa; Tsutomu Asai, Saitama, all of Japan

[21] Appl. No.: 57,694

[22] Filed: May 4, 1993

[51] Int. Cl.$^5$ .............................................. H02K 7/06
[52] U.S. Cl. .................................... 310/82; 310/49 R
[58] Field of Search ................ 310/49 R, 49 A, 67 R, 310/82, 83, 89, 90, 103

[56] References Cited

U.S. PATENT DOCUMENTS

| | | | |
|---|---|---|---|
| Re. 29,411 | 9/1977 | Newell | 310/49 R |
| 3,539,847 | 11/1970 | Gifford | 310/82 |
| 4,330,725 | 5/1982 | Hintz | 310/82 |
| 4,906,881 | 3/1990 | Knight | 310/49 R |
| 5,142,932 | 9/1992 | Moya et al. | 310/82 |

Primary Examiner—Steven L. Stephan
Assistant Examiner—Matthew Nguyen
Attorney, Agent, or Firm—Flynn, Thiel, Boutell & Tanis

[57] ABSTRACT

A step motor comprising two sets of annularly arranged electromagnets and which are disposed in left and right frame bodies respectively in bilateral symmetry, a wobble disc of magnetic body arranged between the sets of electromagnets, a supporting shaft which is pivotally coupled to the center of the light surface of the wobble disc and fixedly coupled to a bearing portion at the center of the right frame body, an output shaft which is fixedly coupled to the center of the left surface of the wobble disc by way of a universal joint and rotatably supported by a bearing portion at the center of the left frame body, a crown gear fixedly arranged on the magnetically permeable armatures of the right set of electromagnets and a crown gear fixedly arranged on the right surface of the wobble disc at the outer circumferential portion thereof which confronts the crown gear on the right set of electromagnets and has teeth different in number from those of the crown gear. The output shaft can produce a high torque at a low speed by successively energizing the annularly arranged electromagnets thereby successively attracting the wobble disc to wobble it and converting the wobbling into turning force by way of the two crown gears having teeth different in number meshing with each other.

4 Claims, 4 Drawing Sheets

NUTATING STEP MOTOR

BACKGROUND OF THE INVENTION

1. Field of the Invention

The present invention relates to a nutating step motor for producing the rotation of the output shaft thereof with a high torque and a low speed caused by the difference in the number of teeth between a crown gear on a wobble disc of magnetic body which wobbles as it is successively attracted by each of annularly arranged electromagnets when it is energized successively, and another crown gear fixedly arranged on the magnetically permeable cores of the electromagnets.

The step motor according to the present invention is not only optimum for machine tools which require a low speed revolution under a computer numerical control, mainly such as various industrial robots, business machines, NC, MC, etc., but also has features useful in various fields such that it can be directly coupled to a machine tool which requires a very low speed revolution without using a reduction gear.

2. Description of the Related Art

A conventional step motor of this kind s disclosed in U.S. Pat. No. 3,644,764 which expired Feb. 22, 1989 as illustrated in FIG. 1 of the attached drawings. The motor a attracts a wobble disc b of magnetic body by the electromagnetic force of an energized electromagnet e thereby to produce mating contact between a crown gear c provided at the outer circumferential portion $b_2$ of the wobble disc b and a crown gear d which is provided on the side of the frame in such a way as to confront the crown gear c, so that the wobble disc b continues wobbling.

At that time, the wobble disc b only wobbles circularly by magnetic attractive force but does not rotate at all. An inner crown gear f provided on the wobble disc b adjacent to the center thereof mates with a crown gear h provided at the end portion i of the output shaft g in such a way as to confront the inner crown gear f as a result of the wobbling of the wobble disc b, so that the output shaft g, is rotated due to the difference in the number of teeth between the inner crown gear f and the crown gear h.

Accordingly, the output shaft turns due to the difference in the number of teeth between the inner crown gear f and the crown gear h, i.e., which is usually one or two, as a result of a cycle of wobbling of the wobble disc b.

(1) As illustrated in FIG. 1, the step motor wobbles smoothly by the crown gear c provided at the outer circumferential portion $b_2$ of the wobble disc b and the crown gear d which is provided on the side of the frame so as to confront the crown gear c. The step motor is further provided with a crown gear f on the wobble disc 1 inside the crown gear c and a crown gear h on the output shaft for rotating the same.

Since the step motor is provided with two sets of gears, i.e., the crown gears c and d which mate with each other as a result of wobbling of the wobble disc b and the crown gears f and h for rotating the output shaft thereof, it is complicated in structure and costs high.

(2) The inner crown gears f and h for rotating the output shaft thereof due to the difference in the number of teeth therebetween illustrated in FIG. 1 are small in pitch circle diameters and inevitably cannot have many teeth in order to obtain a high torque at a low speed since they are provided inside and the pitch of the teeth is determined as illustrated in FIG. 2, so that the step motor cannot prove the merit of the low speed motor.

(3) Moreover, when the inner crown gears f and h for rotating the output shaft cannot have many teeth, it is not only difficult to position the step angle with accuracy but also there occur problems that the teeth wear out rapidly to cause damages, the lives of the devices are shortened, and so on.

(4) Since the step motor has to be provided with the crown gears c and d for only mating with each other by the wobbling of the wobble disc b and the crown gears f and h for rotating the output shaft, it need many gears, so that it is complicated in structure, troublesome in assembling and expensive in manufacturing.

It is the object of the present invention to solve the problems (1) thru (4) set forth above.

SUMMARY OF THE INVENTION

The present invention has been made in view of the technical problems of the prior art set forth above and to provide a step motor comprising two sets of annularly arranged electromagnets and which are disposed in left and right frame bodies respectively in bilateral symmetry, each of the electromagnets having therein a magnetically permeable armature, a wobble disc of magnetic body arranged between said sets of electromagnets, a supporting shaft which is pivotally coupled to the center of the right surface of the wobble disc and fixedly coupled to a bearing portion at the center of the right frame body, an output shaft which is fixedly coupled to the center of the left surface of the wobble disc by way of a universal joint and is rotatably supported by a bearing portion 7 at the center of the left frame body, a crown gear fixedly arranged on the magnetically permeable armatures of the right set of electromagnets and a crown gear fixedly arranged on the right surface of said wobble disc at the outer circumferential portion thereof which confronts the crown gear and has teeth different in number from those of the crown gear so as to produce a rotating force at the output shaft on the left side of the wobble disc through the universal joint with a simple structure.

The large diameter of the crown gear on the wobble disc is very effective for positioning a fine step angle with high accuracy since it can be provided with many teeth thereon so as to obtain a very low speed output.

DETAILED EMBODIMENT OF THE INVENTION

An embodiment of the present invention will be described hereinafter with reference to drawings.

Figure 1:
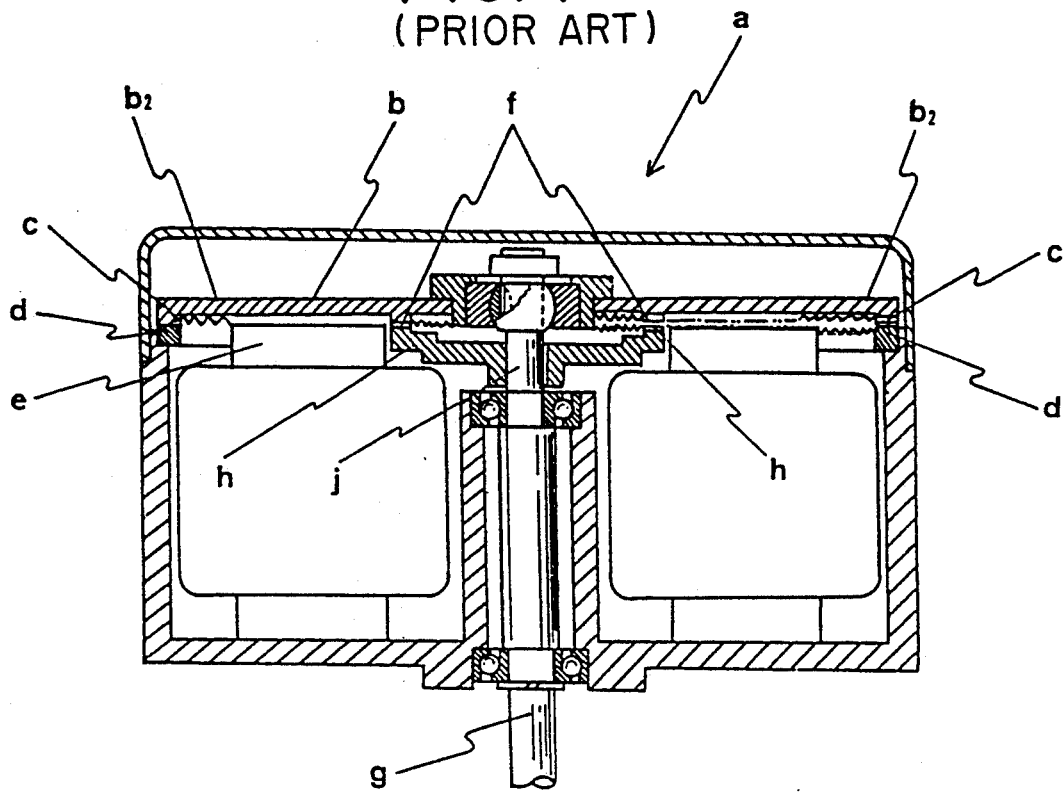
FIG. 1 is a cross-sectional view cut in the central portion thereof showing a conventional step motor employing a wobble disc of this kind.
Figure 2:
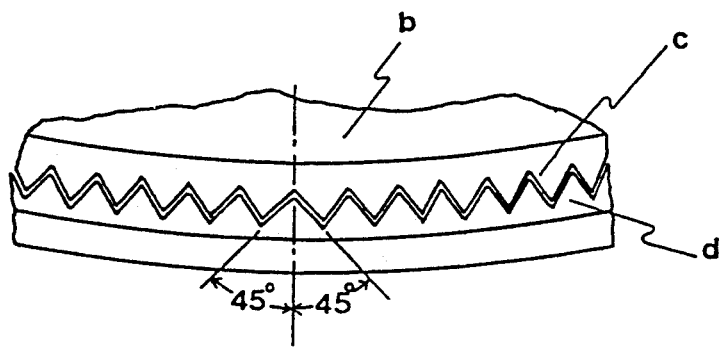
FIG. 2 is a partially cut off perspective view of a wobble disc in FIG. 1.
Figure 3:
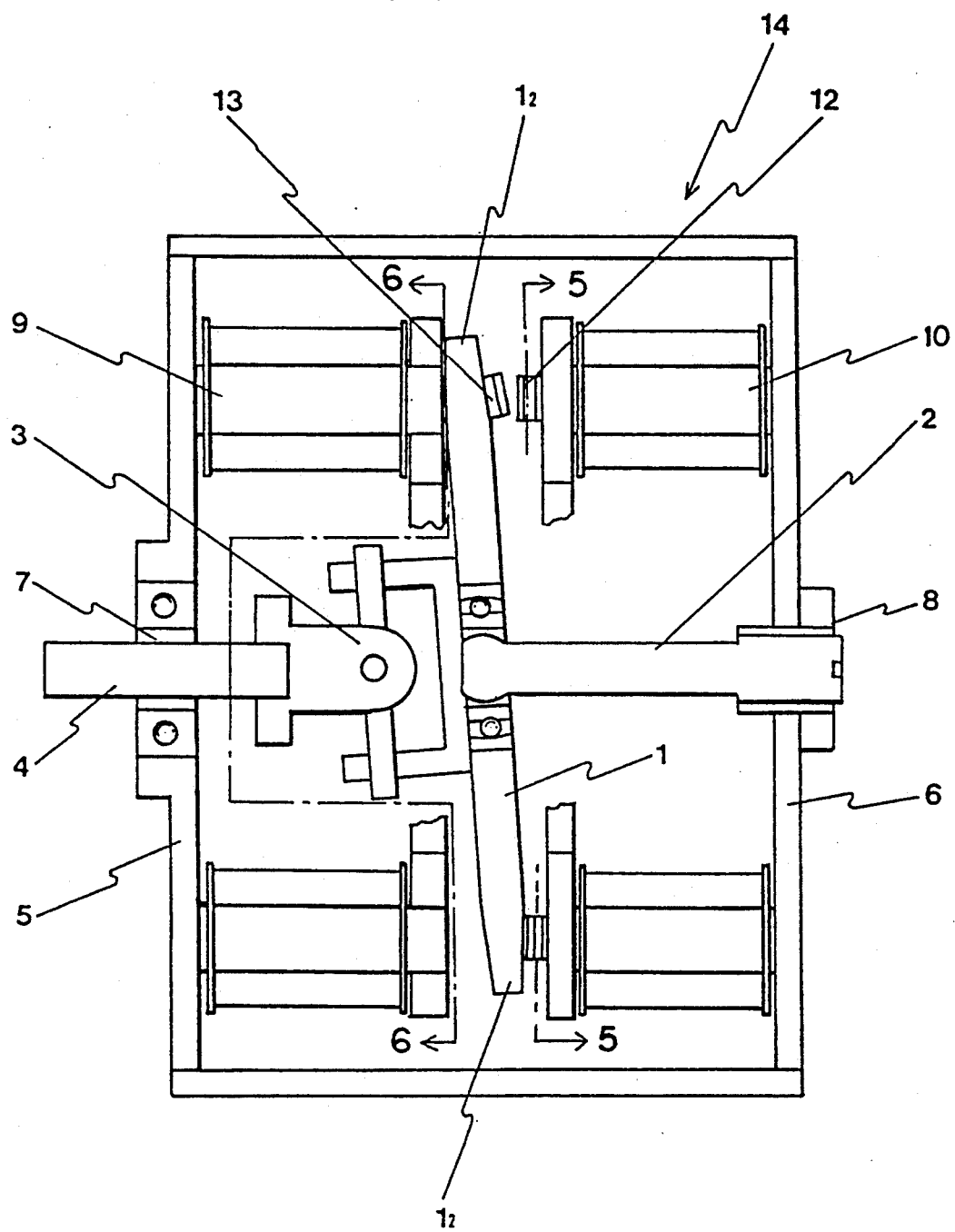
FIG. 3 is a partially cut off longitudinally cross-sectional view of a step motor according to an embodiment of the present invention.
Figure 4:
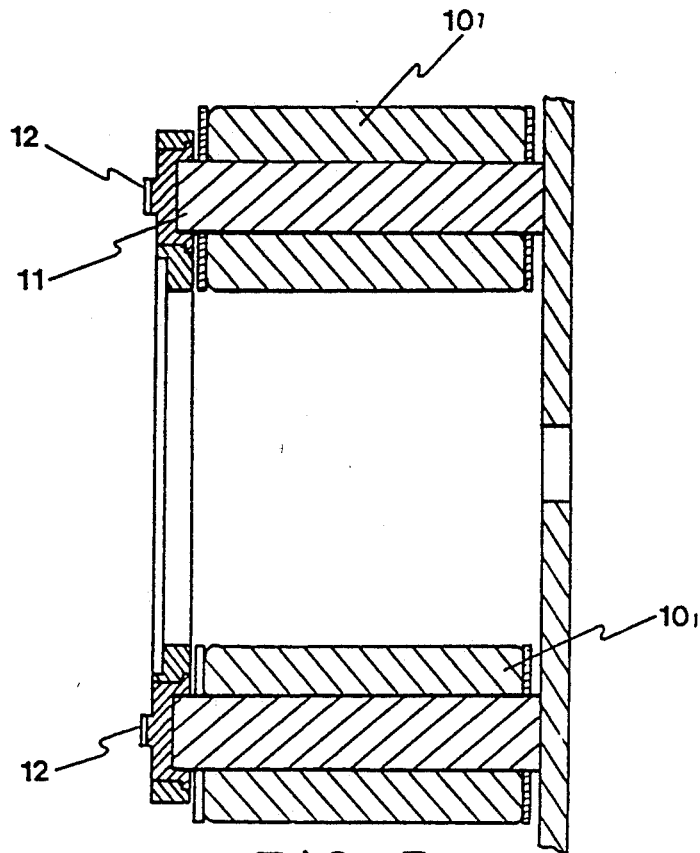
FIG. 4 is an enlarged view of a portion of the step motor which includes the teeth of a crown gear annularly arranged on the magnetically permeable armatures of the electromagnets in FIG. 3.

FIG. 3 is a partially cut away cross-sectional view showing a main portion of the present invention. In the figure, a wobble disc 1 comprises a supporting shaft 2 pivoted at the center of the right surface thereof and an output shaft 4 coupled thereto by way of a universal joint 3 at the center of the left surface thereof, wherein the supporting shaft 2 is fixed to a bearing portion 8 provided at the central portion of a right frame body 6 while the output shaft 4 is rotatably supported by a bearing portion 7 provided at the central portion of a left frame body 5.

Figure 5:
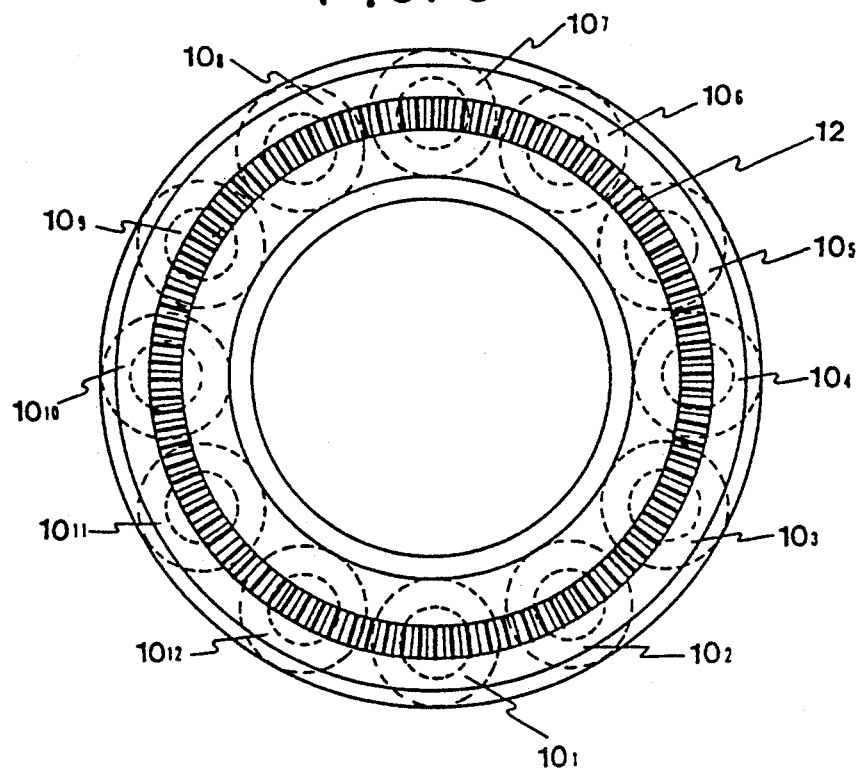
FIG. 5 is a side cross-sectional view cut along the the line 5-5 showing the configuration of the electromagnets and the annularly arranged teeth on the magnetically permeable armatures of the electromagnets in FIG. 3.
Figure 6:
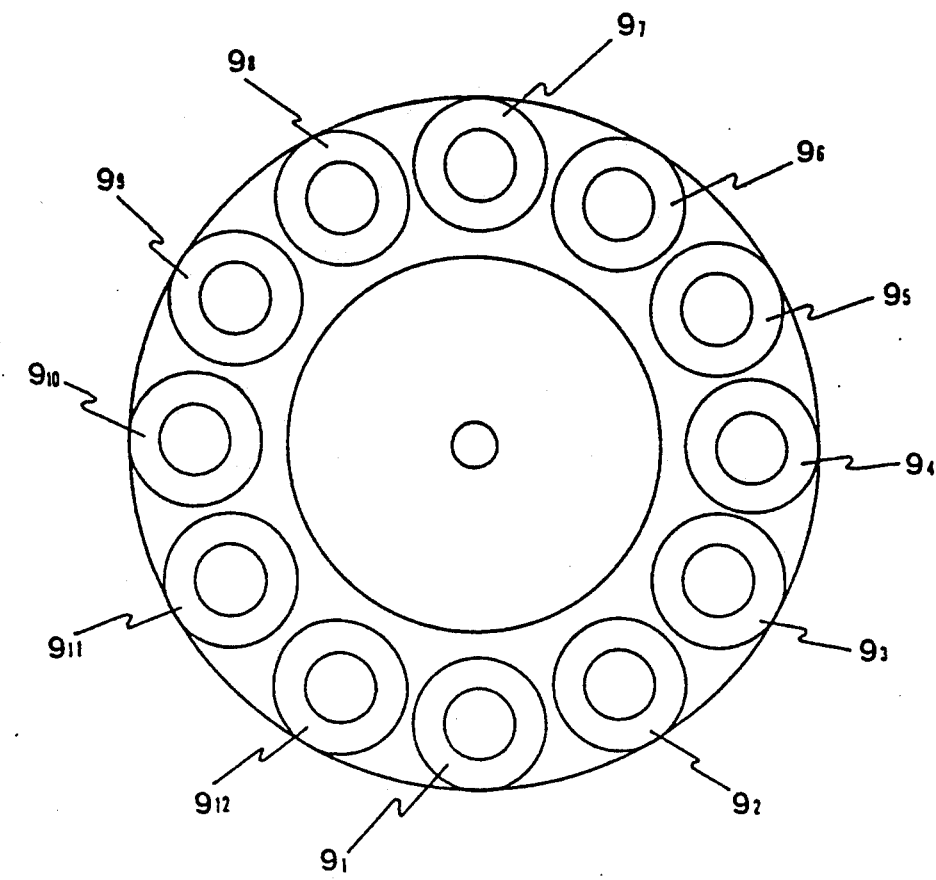
FIG. 6 is a side cross-sectional view cut along the line 6-6 showing the arrangement of the electromagnets in FIG. 3.
Figure 7:
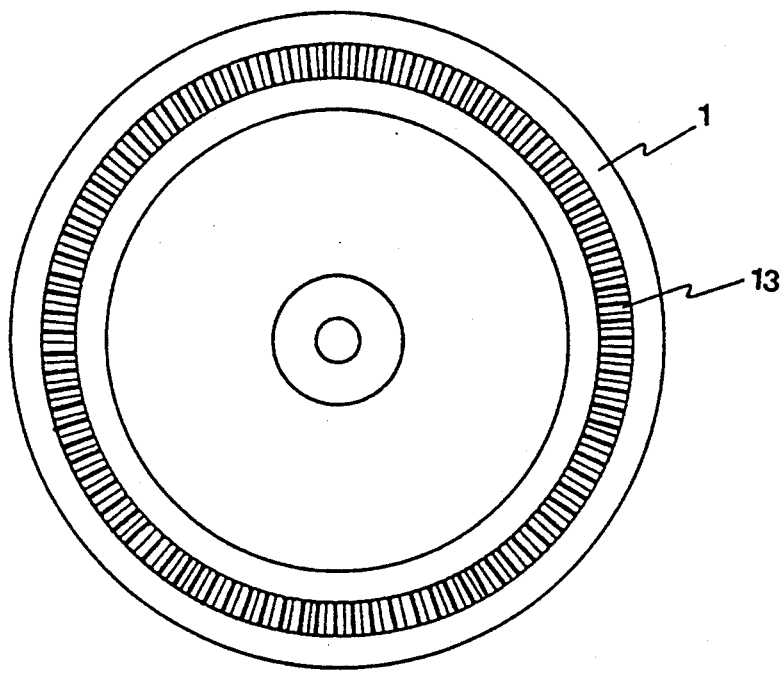
FIG. 7 is a partially cut away side view of the wobble disc in FIG. 3.

Two sets of annularly arranged electromagnets 9 and 10 (each set comprises 12 electromagnets according to this embodiment) are provided in the left and right frame bodies 5 and 6 respectively in bilateral symmetry, wherein the set of electromagnets 9 comprises electromagnets $9_1, 9_2, 9_3, 9_4, 9_5, 9_6, 9_7, 9_8, 9_9, 9_{10}, 9_{11}$ and $9_{12}$ while the set of electromagnets 10 comprises electromagnets $10_1, 10_2, 10_3, 10_4, 10_5, 10_6, 10_7, 10_8, 10_9, 10_{10}, 10_{11}$ and $10_{12}$. The wobble disc 1 of magnetic body equipped with a crown gear 13 on the circumferential portion $1_2$ of a surface thereof as illustrated in a cross-sectional plan view in FIG. 7 is provided between the sets of electromagnets 9 and 10. The other crown gear 12 is provided on the magnetically permeable armatures 35 of the set of electromagnets 10 so as to confront the crown gear 12, wherein the number of teeth is different between the crown gears 12 and 13 as illustrated in FIGS. 5 and 7.

The operation of the step motor according to this embodiment will be described hereinafter. The wobble disc 1 which is disposed between two sets of annularly arranged electromagnets 9 ($9_1, 9_2, 9_3, 9_4, 9_5, 9_6, 9_7, 9_8, 9_9, 9_{10}, 9_{11}$ and $9_{12}$) and 10 ($10_1, 10_2, 10_3, 10_4, 10_5, 10_6, 10_7, 10_8, 10_9, 10_{10}, 10_{11}$ and $10_{12}$) provided in the left and right frame bodies 5 and 6 in bilateral symmetry is always attracted in the directions opposite to each other by the two sets of electromagnets 9 and 10 respectively at the diagonal end portions thereof by successively energizing the sets of electromagnets 9 and 10 shifting the phase therebetween by 180°, e.g., successively energizing the electromagnets $9_1$ and $10_7, 9_2$ and $10_8, 9_3$ and $10_9, \ldots$, so that the attracting force of the electromagnets 9 is reinforced by the attracting force of the electromagnets 10 at the other diagonal end of the crown gear 13 so as to bring the crown gears 12 and 13 into a strong and steady mesh.

Furthermore, since the crown gear 12 is provided on the magnetically permeable armatures 11 of the set of electromagnets 10, the crown 13 gear provided on the wobble disc 1 steadily meshes with the crown gear 12 provided on the magnetically permeable armatures 11 as the wobble disc 1 composed of magnetic body wobbles while it is strongly attracted by a strong magnetic force. Such a steady mesh prevents the abrasion of the crown gears and preserves the life of the device.

Since the output shaft 4 coupled to the universal joint 3 turns by the difference in the number of teeth between the crown gears 12 and 13, which is usually 1 or 2, during a cycle of wobbling of the wobble disc 1, the output shaft 4 rotates with very low speed and very high torque.

Since the crown gear 13 is provided on the wobble disc 1 at the outer circumferential portion $1_2$ thereof according to the present invention, the crown gear 13 for generating the rotation of the output shaft is far larger in circumference than that of the prior art, so that it can have many teeth for positioning the step angle with high accuracy and producing a strong starting torque. Furthermore, since the crown gears 12 and 13 have many teeth, a very slow, smooth and strong rotating force can be produced from the output shaft to provide an epoch-making motor of low speed and high torque.

As described in detail above, the wobble disc disposed between two sets of annularly arranged electromagnets provided in the step motor in bilateral symmetry is attracted by the electromagnets and wobbles while the crown gear provided on the wobble disc meshes with the crown gear provided on the magnetically permeable armatures of the electromagnets by successively energizing the two sets of electromagnets shifting the phase therebetween by 180°, so that the output shaft coupled to the universal joint turns by the difference in the number of teeth between the crown gears during a cycle of wobbling of the wobble disc.

Particularly the crown gear is provided on the outer circumferential portion of the wobble disc according to the present invention, the output shaft can be turned by small steps, can be positioned in turning angle with high accuracy and can produce a strong starting torque and a very slow and strong revolution.

The step motor according to the present invention is an epochmaking invention as set forth above since it can be manufactured easily and produced at a low cost due to its comparatively simple structure as a device of this kind.

What is claimed is:

1. A step motor comprising:
    a frame;
    a first plurality of annularly arranged electromagnets disposed within said frame;
    a second plurality of annularly arranged electromagnets disposed within said frame and coaxially spacedapart from said first plurality of electromagnets, each of said first and second pluralities of electromagnets having therein a magnetically permeable armature;
    a wobble disc coaxially arranged between said first and second pluralities of electromagnets, said wobble disc formed of a magnetic material;
    a supporting shaft pivotally and rotatably coupled to a central portion of said wobble disc and fixedly coupled to a bearing disposed on a first wall of said frame, said supporting shaft extending along a longitudinal axis of said frame concentrically within said first plurality of electromagnets;
    a universal joint fixedly coupled to said central portion of said wobble disc on a side thereof remote from said supporting shaft;
    an output shaft fixedly coupled to said universal joint and rotatably supported by a bearing portion disposed on a second wall of said frame, said second wall being axially disposed from said first wall, said output shaft extending along said longitudinal axis and concentrically disposed within said second plurality of electromagnets;

a first annular crown gear fixedly arranged on the magnetically permeable armatures of said first plurality of electromagnets and having a first predetermined number of gear teeth; and a second annular crown gear fixedly arranged on a side of said wobble disc adjacent said first plurality of electromagnets, said second annular crown gear disposed coaxially adjacent said first annular crown gear on an outer circumferential edge portion of said wobble disk, said second crown gear having a second predetermined number of gear teeth different than said first predetermined number of gear teeth.

2. The step motor according to claim 1, wherein said wobble disc is simultaneously attracted by an electromagnet from each of said first and second pluralities of electromagnets, said electromagnets from said respective pluralities of electromagnets being positioned radially oppositely from each other relative to said central portion of said wobble disc.

3. The step motor according to claim 1, wherein said supporting shaft is rotatably supported by said bearing portion disposed on said second wall of said frame and is fixedly coupled to said universal joint.

4. The step motor according to claim 1, wherein said first and second crown gears cooperatively mesh together to rotate said output shaft due to the difference between said first and second predetermined number of teeth.

* * * * *